US006941056B2

(12) United States Patent
Hirota

(10) Patent No.: US 6,941,056 B2
(45) Date of Patent: Sep. 6, 2005

(54) LIGHT GUIDE AND METHOD FOR PRODUCING TRANSPARENT THERMOPLASTIC RESIN COMPOSITION FOR LIGHT GUIDE

(75) Inventor: Satoru Hirota, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 217 days.

(21) Appl. No.: 10/149,968

(22) PCT Filed: Nov. 6, 2001

(86) PCT No.: PCT/JP01/09690

§ 371 (c)(1), (2), (4) Date: Jun. 18, 2002

(87) PCT Pub. No.: WO02/39153

PCT Pub. Date: May 16, 2002

(65) Prior Publication Data

US 2003/0007764 A1 Jan. 9, 2003

(30) Foreign Application Priority Data

Nov. 13, 2000 (JP) ............................. 2000-345296

(51) Int. Cl.[7] ..................... G02B 6/00; G02F 1/1335; G09F 9/00
(52) U.S. Cl. ................ 385/141; 385/143; 385/145; 524/105; 524/106; 350/96.1; 350/96.15
(58) Field of Search .................. 385/123, 141, 385/143, 145; 324/178, 100, 105, 106, 101; 350/96.1, 96.15, 96.24, 96.29, 96.3, 96.34, 96.32; 264/1.24, 1.27, 1.29

(56) References Cited

U.S. PATENT DOCUMENTS

| 3,737,495 | A | * | 6/1973 | Nagano et al. ............. 264/564 |
| 4,003,973 | A | * | 1/1977 | Kurokawa et al. .......... 264/101 |
| 4,422,719 | A | * | 12/1983 | Orcutt ........................ 385/123 |
| 4,458,986 | A | * | 7/1984 | Yuto et al. .................. 385/141 |
| 4,466,697 | A | * | 8/1984 | Daniel ........................ 385/123 |
| 4,714,729 | A | * | 12/1987 | Christy et al. .............. 524/281 |
| 4,768,860 | A | * | 9/1988 | Tatsukami et al. .......... 385/143 |
| 4,828,359 | A | * | 5/1989 | Ueba et al. ................. 385/123 |
| 4,888,036 | A | * | 12/1989 | Clasen ........................ 65/17.2 |
| 4,919,513 | A | * | 4/1990 | Nakakuki et al. ........... 385/127 |
| 5,067,831 | A | * | 11/1991 | Robbins et al. ............. 385/123 |
| 5,117,472 | A | * | 5/1992 | Blyler et al. ................. 385/28 |
| 5,406,641 | A | * | 4/1995 | Bigley et al. ................ 385/141 |
| 5,485,541 | A | * | 1/1996 | Bigley et al. ................ 385/141 |
| 5,579,429 | A | * | 11/1996 | Naum ........................ 385/143 |
| 5,616,638 | A | * | 4/1997 | Hallden-Abberton et al. ........... 524/178 |
| 5,692,088 | A | * | 11/1997 | Ishiharada et al. .......... 385/125 |
| 5,952,096 | A | * | 9/1999 | Yamashita et al. .......... 428/332 |
| 6,091,878 | A | * | 7/2000 | Abramowicz et al. ...... 385/143 |
| 6,215,947 | B1 | * | 4/2001 | Abramowicz et al. ...... 385/143 |
| 6,410,649 | B1 | * | 6/2002 | Oda et al. ................... 525/191 |
| 6,505,942 | B2 | * | 1/2003 | Ohishi et al. ............... 359/601 |
| 6,612,729 | B1 | * | 9/2003 | Hoffman .................... 362/551 |
| 6,625,379 | B1 | * | 9/2003 | Azuma ....................... 385/146 |

FOREIGN PATENT DOCUMENTS

| JP | 2001-076522 | 5/1990 |
| JP | 6-242319 A | 9/1994 |
| JP | 11-38412 A | 2/1999 |
| JP | 2000-147208 A | 5/2000 |
| JP | 2000-169722 A | 6/2000 |

\* cited by examiner

Primary Examiner—John R. Lee
Assistant Examiner—David A. Vanore
(74) Attorney, Agent, or Firm—Birch, Stewart, Kolasch & Birch, LLP

(57) ABSTRACT

A light guiding plate, characterized by comprising a transparent thermoplastic resin composition containing 1–200 ppm of fine particles having a refractive index of 1.7–3.0 and an average particle diameter of 0.01–1.0 μm. This light guiding plate is suitable for display devices used in office automation apparatuses such as personal computers, word processors, etc. and various monitors displaying image signals such as panel monitors, television monitors, etc., display devices used in illuminators for indoor or outdoor space, and signs.

5 Claims, 2 Drawing Sheets

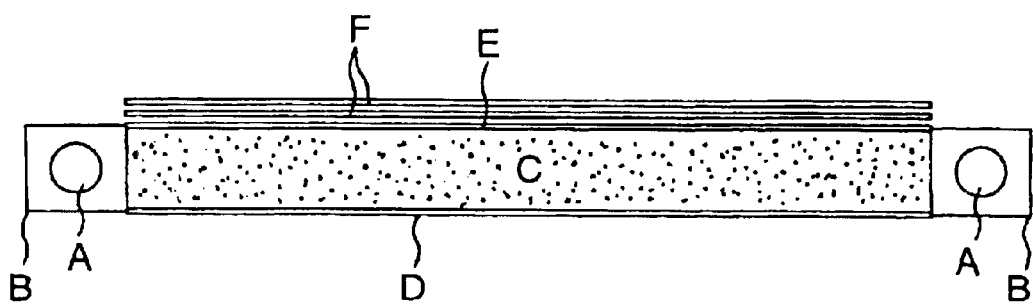
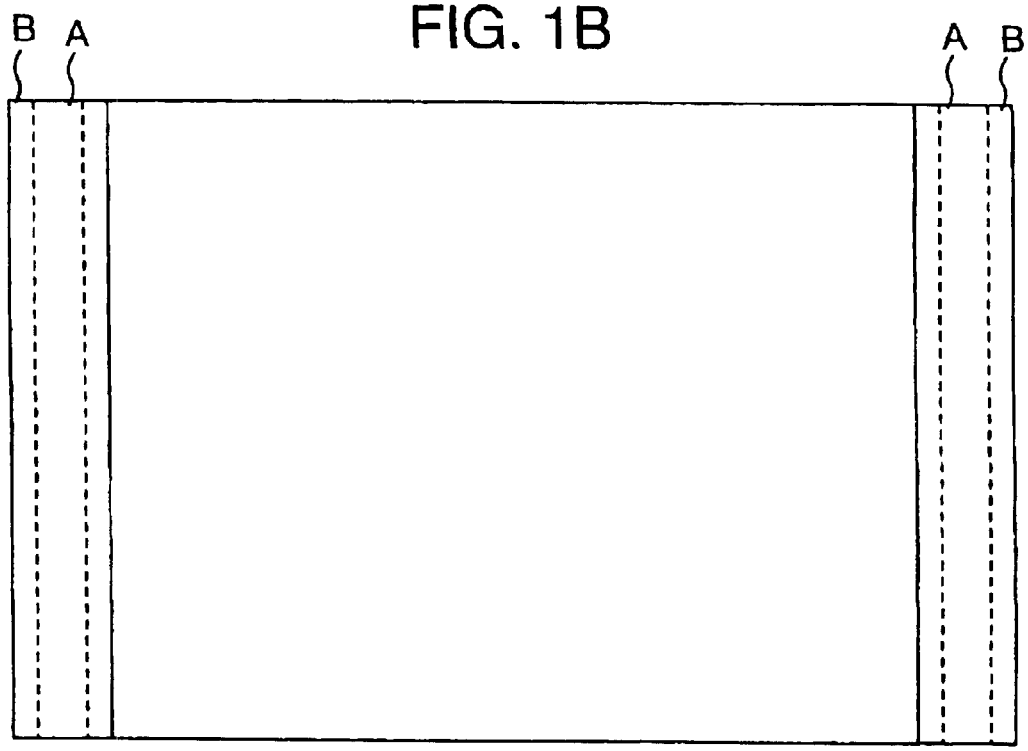

LIGHT GUIDE AND METHOD FOR PRODUCING TRANSPARENT THERMOPLASTIC RESIN COMPOSITION FOR LIGHT GUIDE

This application is the national phase under 35 U.S.C. § 371 of PCT International Application No. PCT/JP01/09690 which has an International filing date of Nov. 6, 2001, which designated the United States of America.

TECHNICAL FIELD

The present invention relates to a light guiding plate suitable for display devices used in office automation apparatuses such as personal computers, word processors, etc., and various monitors displaying image signals such as panel monitors, television monitors, etc., display devices used in illuminators for indoor or outdoor space, and signs.

BACKGROUND ART

Transparent thermoplastic resins, especially, methacrylic resins have been employed for a wide variety of illumination uses because of their excellent light transmittance and mechanical characteristics. Recently, they are used as light guiding plates for back-lighting in display devices provided with illumination lamps. As the back-lighting systems, there are generally used two systems of so-called direct-light type in which the light guiding plate is interposed between a light source and a liquid crystal unit, and edge-light type in which a light source is provided at the side edge portions of the light guiding plate, and at present the edge-light type is mainly employed. Especially, with recent strong demands for high luminance display devices, large-sized display devices and thin display devices, luminous devices have been developed under the conception of making lighter, larger and thinner devices, and, among them, high luminance face luminous devices of edge-light type are especially desired.

Therefore, as to the light guiding plates used in light source devices, there have also been strongly demanded light guiding plates according to which loss of incident light entering from light source lamp disposed at the side edge portion is reduced as much as possible inside the light guiding plate and the incident light is allowed to efficiently outgo toward the outgoing face.

For meeting these demands, a plurality of technical disclosures have been made on methods for attaining high luminance by using light guiding plate. For example, JP-B-39-1194 discloses a method of obtaining a uniform luminous face by incorporating and dispersing light diffusing particles in a substrate of the light guiding plate. Furthermore, JP-A-4-145485 discloses to attain a high luminance by using a light scattering plastic material containing fine particles different in refractive index as a light guide. Moreover, JP-A-2000-113708 discloses a method for attaining high luminance by dispersing fine particles having hollow structure and differing in refractive index in a light guiding plate.

In the above prior art, fine particles are incorporated, but optimization of the kind and the average particle diameter of the fine particles is not made, and the effect to improve luminance is small, and thus in case the display devices are made larger and thinner, sufficiently high luminance has not yet been obtained.

An object of the present invention is to provide a light guiding plate suitable for display devices used for office automation apparatuses such as personal computers, word processors, etc., and various monitors displaying image signals such as panel monitors, television monitors, etc., display devices used for illuminators for indoor or outdoor space, and signs.

Another object of the present invention is to provide a method for stable production of a resin composition for the light guiding plate.

DISCLOSURE OF INVENTION

As a result of intensive research conducted by the inventors for solving the above problems, it has been found that a light guiding plate obtained from a transparent thermoplastic resin composition containing a given amount of light scattering fine particles having a specific refractive index and a specific average particle diameter can change the progressing direction of the incident light entering from a light source lamp disposed along the side edge of the light guiding plate to a direction perpendicular to the luminous face of the light guiding plate and efficiently scatter the incident light to the side of the luminous face, whereby luminance of face luminescence can be enhanced. Thus, the present invention has been accomplished.

That is, the light guiding plate of the present invention comprises a transparent thermoplastic resin composition containing a transparent thermoplastic resin and fine particles, the refractive index and the average particle diameter of the fine particles being 1.7–3.0 and 0.01–1.0 $\mu$m, respectively, and the amount of the fine particles being 1–200 ppm based on the weight of the transparent thermoplastic resin.

Furthermore, the method for producing the transparent thermoplastic resin composition constituting the light guiding plate of the present invention comprises previously dispersing fine particles in an organic liquid, thereby uniformly dispersing the fine particles in the transparent thermoplastic resin.

BRIEF DESCRIPTION OF DRAWING

FIG. 1 shows one example of an edge-light type liquid crystal light source apparatus which uses the light guiding plate of the present invention, and FIG. 1A is a sectional view of the apparatus and FIG. 1B is a top view of the apparatus. In the drawing, A indicates a light source (a cold cathode-ray tube), B indicates a lamp house, C indicates a light guiding plate containing fine particles wherein the fine particles are not drawn to scale, D indicates a light reflective sheet, E indicates a light diffusing sheet, and F indicates a prism sheet.

BEST MODE FOR CARRYING OUT THE INVENTION

Figure 2:
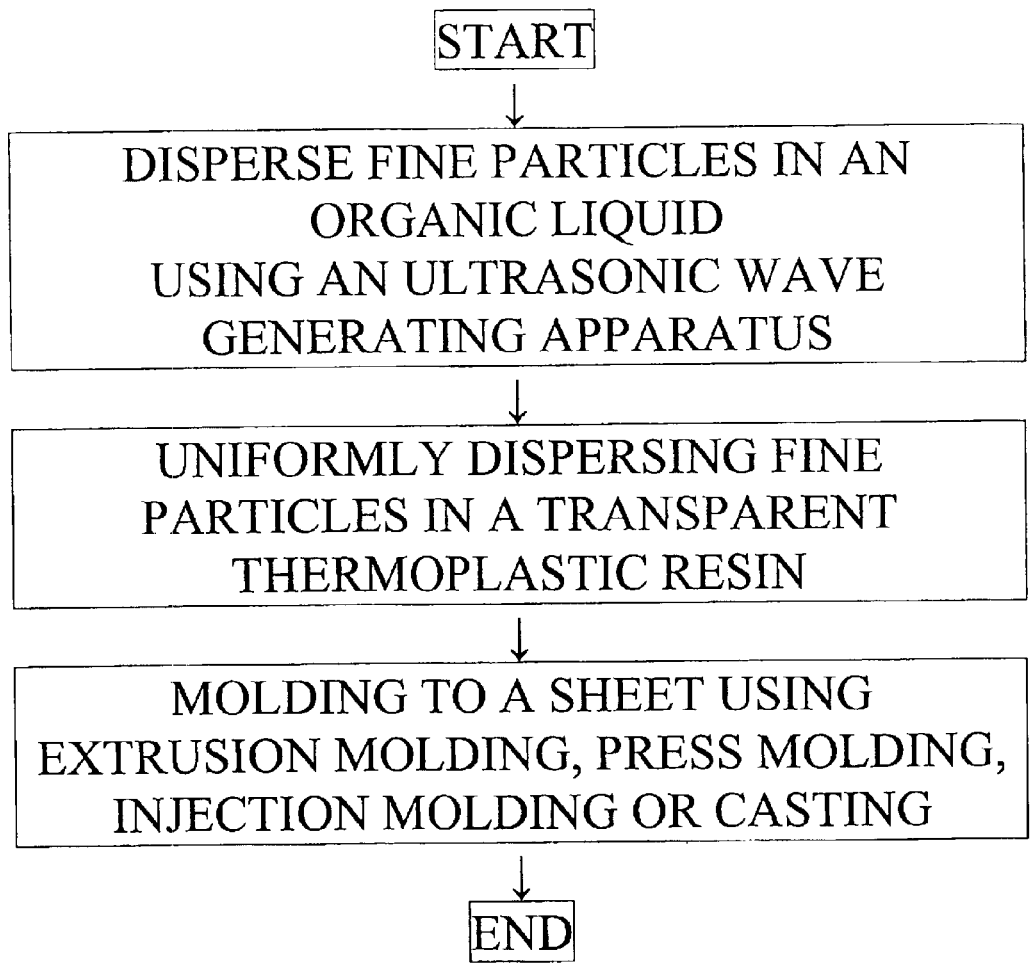
FIG. 2 shows a flow chart of an embodiment of the method of forming the light guiding plate of the present invention.

The present invention will be explained in detail below.

The light guiding plate of the present invention comprises a transparent thermoplastic resin composition containing a transparent thermoplastic resin and fine particles.

As the transparent thermoplastic resin contained in the transparent thermoplastic resin composition, mention may be made of methacrylic resins, polycarbonate resins, styrene resins, cyclic olefin resins, amorphous polyesters, etc. Preferred are methacrylic resins, polycarbonate resins and cyclic olefin resins, and more preferred are methacrylic resins.

As the methacrylic resins, there may be used copolymers of methyl methacrylate or ethyl methacrylate with a monomer copolymerizable therewith. The amount of methyl methacrylate or ethyl methacrylate is preferably not less than 70% by weight based on the weight of the copolymer.

Examples of the monomer copolymerizable with methyl methacrylate or ethyl methacrylate are methacrylate esters such as butyl methacrylate, ethyl methacrylate, methyl methacrylate, propyl methacrylate, cyclohexyl methacrylate, phenyl methacrylate, 2-ethylhexyl methacrylate, etc.; acrylate esters such as methyl acrylate, ethyl acrylate, butyl acrylate, cyclohexyl acrylate, phenyl acrylate, 2-ethylhexyl acrylate, etc.; unsaturated acids such as methacrylic acid, acrylic acid, etc.; and the like. The monomers are not limited to these examples.

The method for the preparation of the methacrylic resins has no special limitation, and they can be prepared by conventional methods.

Furthermore, the methacrylic resins used in the present invention include heat resistant methacrylic resins, low hygroscopic methacrylic resins, high-impact methacrylic resins, etc. The high-impact methacrylic resins are, for example, blends of methacrylic resins with rubber elastomers. The rubber elastomers are disclosed in JP-A-53-58554, JP-A-55-94917, JP-A-61-32346, etc.

As the polycarbonate resins, there may be used polymers derived from divalent phenol compounds, a representative of which is bisphenol A. The method for the preparation of the polycarbonate resins has also no particular limitation, and may be prepared by well known methods such as phosgene method, ester interchange method, solid phase polymerization method, etc.

As the cyclic olefin resins, there may be used amorphous thermoplastic resins such as polymers containing cyclic olefin skeletons in the polymer chains such as norbornene, cyclohexadiene, etc. or copolymers containing norbornene, cyclohexadiene, etc. The method for the preparation of them has no special limitation.

For example, as the cyclic olefin resins mainly composed of norbornene, there may be used resins disclosed in JP-A-60-168708, JP-A-62-252406, JP-A-2-133413, JP-A-63-145324, JP-A-63-264626, JP-A-1-240517, JP-B-57-8815, etc. Furthermore, if necessary, thereto may be added soft polymers such as olefinic soft polymers comprising α-olefins, isobutylenic soft polymers comprising isobutylene, diene soft polymers comprising conjugated dienes such as butadiene, isoprene, etc., cyclic olefin soft polymers comprising cyclic olefins such as norbornene, cyclopentene, etc., organopolysiloxane soft polymers, soft polymers comprising α,β-unsaturated acids and derivatives thereof, soft polymers comprising unsaturated alcohols and amines or acyl derivatives thereof or acetals, polymers of epoxy compounds, fluororubbers, etc.

As the styrene resins, there may be used homopolymers or copolymers containing styrene as an essential component, polymer blends obtained from these polymers and other resins, etc. It is especially preferred to use polystyrene, AS resins which are copolymer resins of acrylonitrile and styrene, and MS resins which are copolymer resins of methacrylate esters and styrene. Moreover, transparent reinforced polystyrenes having a styrene resin phase in which rubbers are distributed can also be suitably used. The method for the preparation of the styrene resins has no special limitation and can be known methods.

As the amorphous polyesters, there may be used amorphous resins among polyesters formed from one or two or more dihydroxy compound units selected from aliphatic glycols such as ethylene glycol, propylene glycol, 1,4-butanediol, neopentyl glycol, hexamethylene glycol, etc., alicyclic glycols such as cyclohexanedimethanol, etc., and aromatic dihydroxy compounds such as bisphenol, 1,3-bis (2-hydroxyethoxy)benzene, 1,4-bis(hydroxyethoxy) benzene, etc. and one or two or more dicarboxylic acid units selected from aromatic dicarboxylic acids such as terephthalic acid, isophthalic acid, 2,6-naphthalenedicarboxylic acid, etc., aliphatic dicarboxylic acids such as oxalic acid, adipic acid, sebacic acid, succinic acid, undecadicarboxylic acid, etc., and alicyclic dicarboxylic acids such as hexahydroterephthalic acid, etc. The method for the preparation of the amorphous polyesters has no special limitation and can be known methods. Commercially easily available ones are KODAR PETG or PCTA manufactured by Eastman Kodak Co., Ltd., etc.

Next, the fine particles contained in the transparent thermoplastic resin composition will be explained.

The fine particles are present in the state of being dispersed in the transparent thermoplastic resin and function as a light diffusing agent, and can improve the luminance of the light guiding plate when the transparent thermoplastic resin composition containing the transparent thermoplastic resin and the fine particles is made into a light guiding plate.

The refractive index of the fine particles is 1.7–3.0, preferably 1.7–2.5, more preferably 1.7–2.0. If the refractive index is less than 1.7, the scattering properties are weak, and if it exceeds 3.0, the scattering properties are too strong, and when the progressing direction of light incident from a light source lamp disposed along the side edge is changed to a direction perpendicular to the luminous face of the light guiding plate, scattering in the vicinity of the lamp becomes too strong, and as a result, unevenness in luminance and unevenness in color tone of outgoing light are apt to occur.

The refractive index in the present invention is a value based on the D line (589 nm) at the temperature of 20° C. As a method for the measurement of refractive index of fine particles, there is, for example, a method according to which the fine particles are dipped in a liquid whose refractive index can be changed little by little and interfaces of the fine particles are observed while changing the refractive index of the liquid, and the refractive index of the liquid when the interfaces of the fine particles become indefinite is measured. For the measurement of the refractive index of the liquid, Abbe refractometer, etc. can be used.

The average particle diameter of the fine particles is 0.01–1.0 μm. If the average particle diameter exceeds 1.0 μm, when the progressing direction of light incident from the light source lamp disposed along the side edge is changed to a direction perpendicular to the luminous face of the light guiding plate, loss of light occurs due to back reflection, etc., and, hence, the incident light cannot be efficiently scattered toward the side of the luminous face and the objective luminance of face luminescence can hardly be obtained. If the average particle diameter is less than 0.01 μm, it becomes difficult to scatter the incident light, and the objective luminance of face luminescence cannot be obtained.

As the method for the measurement of average particle diameter of the fine particles, there are a method of dispersing the fine particles in an organic liquid and measuring a 50% cumulative particle diameter using a micro-track method, a method of obtaining a particle diameter from a transmission type electron photomicrograph of the fine particles and employing the average value of the particle diameters as the average particle diameter, and the like.

Furthermore, the amount of the fine particles is 1–200 ppm based on the weight of the transparent thermoplastic resin. Considering the balance between luminance and unevenness in color tone and outgoing light, the amount is preferably 3–100 ppm, more preferably 5–70 ppm. If the amount of the fine particles is less than 1 ppm, substantially no effect to improve the luminance is exhibited. If the amount of the fine particles exceeds 200 ppm, in the light incident from the light source lamp disposed along the side edge, the proportion of the incident light whose progressing direction is changed to the direction perpendicular to the luminous face in the vicinity of the lamp is too large and no sufficient light reaches the central part of the face luminous body in the case of a large-sized liquid crystal display device of 15 inches or more. As a result, even if a dot pattern is applied to the side of the light guiding plate opposite to the luminous face for correcting the outgoing light, the central part of the luminous face becomes dark and it becomes difficult to properly balance the unevenness of outgoing light. If the proportion of the fine particles exceeds 200 ppm, yellowness of the light guiding plate increases, and, hence, distribution of color tone is apt to occur in the outgoing light within the luminous face.

The shape of the fine particles may be any of true sphere form, spherical form, flaky form, cubic form, indeterminate form, etc., and is not particularly limited.

The impurities contained in the fine particles are desirably reduced as much as possible, and purity of the fine particles is not less than 90% by weight, preferably not less than 95% by weight, more preferably not less than 99% by weight.

The fine particles in the present invention have no special limitation as far as they satisfy the above conditions, and examples thereof are aluminum trioxide (refractive index: 1.7–1.8), titanium dioxide (refractive index: 2.5–2.8), etc. From the point of balancing between the effect to improve luminance of face luminescence and the unevenness in color tone within the luminous face, it is most preferred to use aluminum trioxide as the fine particles. Titanium dioxide is great in the effect to improve luminance of face luminescence, but sometimes causes difference in color tone of outgoing light in the vicinity of lamp and color tone of outgoing light in the central part.

The method for producing the transparent thermoplastic resin composition has no special limitation as far as the fine particles are uniformly dispersed in the transparent thermoplastic resin.

However, preferably, the fine particles are previously uniformly dispersed in an organic liquid and the transparent thermoplastic resin composition is produced using the resulting dispersion. That is, for producing the transparent thermoplastic resin composition constituting the light guiding plate of the present invention, it is preferred to uniformly disperse the fine particles in the transparent thermoplastic resin by previously dispersing the fine particles in an organic liquid. Furthermore, for uniformly dispersing the fine particles in the organic liquid, it is preferred to use an ultrasonic wave generating apparatus.

The organic liquids here include polymerizable monomers constituting the transparent thermoplastic resin in addition to general organic liquids, and have no special limitation as far as the fine particles are hardly dissolved therein and hardly swollen therewith, and the fine particles can be uniformly dispersed therein. Moreover, several kinds of the organic liquids can be mixed at optional proportions and used as a mixture depending on the dispersion state of the fine particles.

Examples of the general organic liquids are ketones such as acetone, methyl ethyl ketone, etc., aromatics such as xylene, toluene, etc., and alcohols such as methanol, ethanol, etc. In the case of the transparent thermoplastic resin being a methacrylic resin, examples of the polymerizable monomers are methacrylate esters such as methyl methacrylate, ethyl methacrylate, propyl methacrylate, butyl methacrylate, cyclohexyl methacrylate, phenyl methacrylate, 2-ethylhexyl methacrylate, etc., acrylate esters such as methyl acrylate, ethyl acrylate, butyl acrylate, cyclohexyl acrylate, phenyl acrylate, 2-ethylhexyl acrylate, etc., unsaturated acids such as methacrylic acid, acrylic acid, etc., and the like.

As methods for uniformly dispersing the fine particles in the transparent thermoplastic resin in the production of the transparent thermoplastic resin composition containing the transparent thermoplastic resin and the fine particles, the following methods can be exemplified.

(1) When the transparent thermoplastic resin and the fine particles are melt kneaded by an extruder:

There is a method which comprises dispersing the fine particles in an organic liquid, preferably, using an ultrasonic wave generating apparatus, mixing the resulting dispersion with the transparent thermoplastic resin, and melt kneading the mixture by an extruder. In this case, the organic liquid used has no limitation as far as the fine particles are not dissolved therein and not swollen therewith, and the fine particles can be uniformly dispersed therein as mentioned above. Moreover, several kinds of the organic liquids can be mixed at optional proportions and can be used as a mixture depending on the dispersion state.

The mixing ratio of the fine particles and the organic liquid can be optionally determined taking into consideration the dispersibility of the fine particles, but it is preferred that amount of the fine particles is in the range of 0.001–80 parts by weight based on 100 parts by weight of the organic liquid.

The mixing ratio of the dispersion comprising the fine particles and the organic liquid and the transparent thermoplastic resin can also be optionally determined taking into consideration the handleability at the mixing extrusion step, but it is preferred that amount of the dispersion is in the range of 0.001–10 parts by weight based on 100 parts by weight of the transparent thermoplastic resin.

The method for mixing the dispersion and the transparent thermoplastic resin has no special limitation. For example, there may be employed known mixing methods such as mixing by Henschel mixer, mixing by super-floater and mixing by tumbler.

As to the extruders used for melt kneading of the mixture, there is no need to use special extruders and they may be usual single-screw or twin-screw extruders, etc. However, from the point of removal of volatile components in the organic liquid used for dispersion, preferred are those which can perform devolatilization by reducing the pressure to preferably not higher than 300 Torr at a vent. Furthermore, from the point of inhibiting the secondary aggregation of the fine particles, the twin-screw extruders are preferred for production of the composition. Temperature of the extruders can be optionally set depending on the kind of the transparent thermoplastic resin used. For example, it is about 180–260° C. in the case of methacrylic resin.

(2) When polymerization is carried out by a casting method to obtain a sheet:

There is a method which comprises dispersing the fine particles in a starting monomer for the transparent thermoplastic resin or a monomer copolymerizable with said starting monomer, preferably, using an ultrasonic wave generating apparatus. In this case, it is preferred that the fine particles are previously dispersed in a part of the starting monomer, followed by mixing with a partially polymerized polymer solution, or the like. The ratio of the amount of the fine particles and that of the starting monomer in which the fine particles are dispersed can be optionally determined considering dispersibility, viscosity at charging, handleability, etc.

Furthermore, there are no special limitations in polymerization conditions such as polymerization temperature, polymerization time, amount of the polymerization initiator, etc. in the casting method and in the method for the formation of sheet (cast plate). As a method for the formation of sheet, mention may be made of, for example, glass cell casting method, continuous casting method, etc.

The ultrasonic wave generation apparatus used for dispersion of the particles has no special limitation, and commercially available ultrasonic cleaning machines, ultrasonic stirrers, etc. can be used. For example, ultrasonic cleaning machines of 28–100 KHz in ultrasonic frequency are generally used. The irradiation time by the ultrasonic wave generating apparatuses can be optionally set depending on the dispersion state of the fine particles, and is preferably 1–60 minutes.

In the present invention, if necessary, an ultraviolet absorber can be added to the transparent thermoplastic resin composition which constitutes the light guiding plate. By the addition of the ultraviolet absorber, coloration due to ultraviolet rays generated from the light source lamp disposed along the side edge of the light guiding plate can be prevented. Especially, in light source devices for color, even after the use of long period of time, color tone of the monitor picture plane can be always kept constant, occurrence of unevenness in color can be inhibited, and, besides, decrease of luminance and increase of unevenness in luminance can also be inhibited. Examples of the ultraviolet absorbers are benzotriazole-based ultraviolet absorbers such as 2-(5-methyl-2-hydroxyphenyl)benzotriazole, 2-[2-hydroxy-3,5-bis($\alpha,\alpha'$-dimethylbenzyl)phenyl]benzotriazole, 2-(3,5-di-t-amyl-2-hydroxyphenyl)benzotriazole, etc.; benzophenone-based ultraviolet absorbers such as 2-hydroxy-4-methoxybenzophenone, 2,2'-dihydroxy-4-methoxybenzophenone, 2-hydroxy-4-n-octoxybenzophenone, etc.; and salicylic acid-based ultraviolet absorbers such as phenyl salicylate, 4-t-butylphenyl salicylate, etc. These ultraviolet absorbers may be used each alone or in combination of two or more.

The ultraviolet absorber can be added in a concentration of 30–2000 ppm, preferably 80–500 ppm based on the transparent thermoplastic resin. If the concentration of the ultraviolet absorber is less than 30 ppm, the effect is small, and if it exceeds 2000 ppm, coloration of the light guiding plate due to the addition of the ultraviolet absorber increases and, besides, decrease of luminance is caused.

Moreover, in the light guiding plate of the present invention, the transparent thermoplastic resin composition may contain fatty acid esters of glycerin such as glycerin monostearate, etc., higher alcohols such as stearyl alcohol, or higher fatty acids such as stearic acid as releasing agents, or antioxidants such as of phenolic type, thioether type, phosphite type, etc. in such a range of concentration as not hindering the attainment of the object of the present invention (usually, in a concentration of not more than 5000 ppm).

The method for molding the light guiding plate of the present invention has no special limitation, and there may be employed known methods, for example, (1) a method of molding the transparent thermoplastic resin composition to a sheet by a sheet molding extruder or a press molding machine, cutting the resulting sheet to a desired size, and subjecting the cut surface to abrasive working, (2) a method of molding the transparent thermoplastic resin composition by an injection molding machine having a mold, and (3) a method of dispersing the fine particles in a syrup containing a starting monomer for the transparent thermoplastic resin or a partial polymer, then polymerizing the monomer or the partial polymer by a casting method to obtain a sheet-like molded article, then cutting it to a desired size, and subjecting the cut surface to abrasive working. In case the light guiding plate is obtained by molding the transparent thermoplastic resin composition by a sheet molding extruder, a press molding machine, an injection molding machine having a mold, etc., from operational and economical view points, there may be employed a method including the steps of preparing a master batch pellet which has a higher concentration of the fine particles in the thermoplastic resin composition than the desired concentration and diluting to the desired concentration with transparent thermoplastic resin at the time of molding.

EXAMPLE

The present invention will be more specifically explained by the following examples and comparative examples, which should not be construed as limiting the invention in any manner.

(Method for Measurement of Average Particle Diameter)

The average particle diameter of the fine particles was measured by the following method.

As to the fine particles of not less than 0.1 μm in average particle diameter, the fine particles were dispersed in an organic liquid by an ultrasonic wave, the resulting dispersion was subjected to measurement by micro-tracking method, and a 50% cumulative particle diameter was taken as an average particle diameter.

As to the fine particles of less than 0.1 μm in average particle diameter, the fine particles were photographed by a transmission type electron microscope, and the longer diameter and the shorter diameter of the resulting particle image were measured. Assuming the average value thereof to be a particle diameter of one particle, the average value of particle diameters of thirty fine particles was taken as an average particle diameter.

(Method for Measurement of Luminance of the Light Guiding Plate, and Method for Visual Evaluation of Unevenness in Color Tone and Unevenness in Outgoing Light)

The measurement and the evaluation were conducted by the light source apparatus shown in FIG. 1. Specifically, a cold cathode tube of 4 mmφ (manufactured by Harison Electric Co., Ltd.) as the light source A was provided in the lamp house B disposed at both side edges on the 319 mm length sides of the light guiding plate C. REFWHITE RW 75CB (manufactured by Kimoto & Co., Ltd.) was used as the light reflecting sheet D, one sheet of D121 (manufactured by Tsujiden Co., Ltd.) as the light diffusing sheet E was put on the upper surface of the light guiding plate C, and two sheets of BEFII (manufactured by Sumitomo 3M Co., Ltd.) as the prism sheet F were put on the light diffusing sheet E in such a manner that the prism rows of one sheet crossed those of another sheet at right angles (i.e., the prism rows of the lower prism sheet crossed the cold cathode-ray tube at right angles, and the prism rows of the upper prism sheet were parallel to the cold cathode tube). A voltage of 12 V was applied to the cold cathode tube from a direct voltage stabilization apparatus, and after lighting for 20 minutes, luminance at 100 measuring points which were provided by dividing the whole luminous face into 100 portions (10×10 in length and breadth) was measured by a luminance meter (CA-1000 manufactured by Minolta Camera Co., Ltd.) provided at a distance of 1 m from the luminous face. Then, an average luminance of the resulting measured values was calculated. Furthermore, the luminous face was visually observed to evaluate unevenness of color tone and that of outgoing light.

(Method for Measurement of Light Transmittance of Long Optical Path)

Tristimulus values XYZ of a luminous flux transmitting through a test piece of 220 mm length (6 mm in width×30 mm in height×220 mm in length) were measured at an angle of visual field of 10° using a color and color difference meter Model TC-1500 MC manufactured by Tokyo Denshoku Co., Ltd. as a measuring device and standard light C as a light source. The value Y was taken as a light transmittance (Asahi Kasei method).

(Method for Measurement of Yellowness of Long Optical Path)

Tristimulus values XYZ of a luminous flux transmitting through a test piece of 220 mm length (6 mm in width×30 mm in height×220 mm in length) were measured at an angle of visual field of 10° using the above TC-1500 MC as a measuring device and standard light C as a light source. Yellowness α of the test piece was calculated from the resulting values XYZ by the following formula (1). Furthermore, without setting the test piece, tristimulus values XYZ were measured, and yellowness β of air was similarly calculated by the following formula (1). The resulting values α and β were substituted for the yellowness α and β in the following formula (2) to obtain the long optical path yellowness of the respective test pieces.

Yellowness($\alpha$, $\beta$)=100 (1.28$X$−1.06$Z$)/$Y$    (1)

Long optical path yellowness=yellowness $\alpha$−yellowness $\beta$    (2)

(Preparation of Methacrylic Resin Pellets)

150 ppm of 1,1-di-t-butylperoxy-3,3,5-trimethylcyclohexane and 300 ppm of n-octylmercaptan were added to a monomer mixture comprising 79.9% by weight of methyl methacrylate, 5.1% by weight of methyl acrylate and 15% by weight of ethylbenzene and these were uniformly mixed. The resulting mixed solution was continuously fed to a closing type pressure resistant reaction vessel of 10 liters in internal volume, and polymerization was carried out at an average temperature of 130° C. for an average residence time of 2 hours with stirring. Then, the resulting polymer was continuously delivered to a storage tank connected to the reaction vessel, the volatile components were removed under reduced pressure, and the polymer was continuously transferred to an extruder in molten state. A given amount of 2-(5-methyl-2-hydroxyphenyl) benzotriazole (an ultraviolet absorber) molten by heating at 140° C. was fed to the extruder from a side part thereof by a feed pump, and these were extruded to obtain a methacrylic resin pellets. The resulting methacrylic resin pellets were analyzed to find that they had a copolymerization ratio of 94.0% by weight of methyl methacrylate unit and 6.0% by weight of methyl acrylate unit, and contained 150 ppm of 2-(5-methyl-2-hydroxyphenyl)benzotriazole.

(Preparation of Raw Material Pellets A)

0.06 g of aluminum trioxide (average particle diameter: 0.45 µm, refractive index: 1.76; manufactured by Nippon Light Metal Co., Ltd.) was dispersed in 20 g of a mixed organic liquid of xylene:methanol=3:1 for 30 minutes at an oscillation frequency of 38 KHz using an ultrasonic cleaning machine (US-4 manufactured by IUCHI), and it was confirmed that uniform dispersion was attained. Thereafter, the dispersion was uniformly sprayed on 3 kg of the methacrylic resin pellets, followed by blending the pellets as they were by a Henschel mixer (manufactured by Mitsui Miike Kogyo Co., Ltd.) at 1400 revolutions for 1 minute. This operation was repeated until the amount of the mixed pellets reached the necessary amount. The resulting mixed pellets were extruded by a 30 mmφ twin-screw extruder (manufactured by Nakatani Co., Ltd.) while carrying out devolatilization under reduced pressure of 100 Torr to obtain a methacrylic resin composition containing 20 ppm of aluminum trioxide. This was referred to as raw material pellets A.

(Preparation of Raw Material Pellets B)

0.60 g of aluminum trioxide (average particle diameter: 0.05 µm, refractive index: 1.76; manufactured by Nippon Light Metal Co., Ltd.) was dispersed in 20 g of a mixed organic liquid of xylene:methanol=3:1 for 30 minutes at an oscillation frequency of 38 KHz using an ultrasonic cleaning machine (US-4 manufactured by IUCHI), and it was confirmed that uniform dispersion was attained. Thereafter, the dispersion was uniformly sprayed on 3 kg of the methacrylic resin pellets, followed by carrying out blending and extrusion in the same manner as in the preparation of the raw material pellets A to obtain a methacrylic resin composition containing 200 ppm of aluminum trioxide. This was referred to as raw material pellets B.

(Preparation of Raw Material Pellets C)

0.021 g of aluminum trioxide (average particle diameter: 2 µm, refractive index: 1.76; manufactured by Nippon Light Metal Co., Ltd.) was dispersed in 20 g of a mixed organic liquid of xylene:xylene:methanol=3:1 for 30 minutes at an oscillation frequency of 38 KHz using an ultrasonic cleaning machine (US-4 manufactured by IUCHI), and it was confirmed that uniform dispersion was attained. Thereafter, the dispersion was uniformly sprayed on 3 kg of the methacrylic resin pellets, followed by carrying out blending and extrusion in the same manner as in the preparation of the raw material pellets A to obtain a methacrylic resin composition containing 7 ppm of aluminum trioxide. This was referred to as raw material pellets C.

(Preparation of Raw Material Pellets D)

0.15 g of titanium dioxide (average particle diameter: 0.04 µm, refractive index: 2.71; manufactured by Ishihara Sangyo Co., Ltd.) was pre-dispersed in 20 g of a mixed organic liquid of xylene:methanol=3:1 for 30 minutes at an oscillation frequency of 38 KHz using an ultrasonic cleaning machine (US-4 manufactured by IUCHI), and it was confirmed that uniform dispersion was attained. Thereafter, the dispersion was uniformly sprayed on 3 kg of the methacrylic resin pellets, followed by carrying out the same blending and extrusion as in the preparation of the raw material pellets A to obtain a methacrylic resin composition containing 50 ppm of titanium dioxide. This was referred to as raw material pellets D.

(Preparation of Raw Material Pellets E)

0.15 g of aluminum trioxide fine particles (average particle diameter: 0.45 µm, refractive index: 1.76; manufactured by Nippon Light Metal Co., Ltd.) were uniformly sprayed on 3 kg of the methacrylic resin pellets without carrying out the pre-dispersion in the organic liquid, followed by blending the pellets as they were by a Henschel mixer (manufactured by Mitsui Miike Kogyo Co., Ltd.) at 1400 revolutions for 1 minute. Thereafter, the pellets were extruded in the same manner as in the preparation of the raw material pellets A to obtain a methacrylic resin composition containing 50 ppm of aluminum trioxide. This was referred to as raw material pellets E.

(Preparation of Raw Material Pellets F)

0.15 g of calcium carbonate (average particle diameter: 0.04 μm, refractive index: 1.66) was dispersed in 20 g of a mixed organic liquid of xylene:methanol=3:1 for 30 minutes at an oscillation frequency of 38 KHz using an ultrasonic cleaning machine (US-4 manufactured by IUCHI), and it was confirmed that uniform dispersion was attained. Thereafter, the dispersion was uniformly sprayed on 3 kg of the methacrylic resin pellets, followed by carrying out the same blending and extrusion as in the preparation of the raw material pellets A to obtain a methacrylic resin composition containing 50 ppm of calcium carbonate. This was referred to as raw material pellets F.

(Preparation of Raw Material Pellets G)

0.15 g of barium sulfate (average particle diameter: 0.06 μm, refractive index: 1.64) was dispersed in 20 g of a mixed organic liquid of xylene:methanol=3:1 for 30 minutes at an oscillation frequency of 38 KHz using an ultrasonic cleaning machine (US-4 manufactured by IUCHI), and it was confirmed that uniform dispersion was attained. Thereafter, the dispersion was uniformly sprayed on 3 kg of the methacrylic resin pellets, followed by carrying out the same blending and extrusion as in the preparation of the raw material pellets A to obtain a methacrylic resin composition containing 50 ppm of barium sulfate. This was referred to as raw material pellets G.

(Preparation of Raw Material Pellets H)

0.30 g of aluminum trioxide (average particle diameter: 0.45 μm, refractive index: 1.76; manufactured by Nippon Light Metal Co., Ltd.) was dispersed in 20 g of a mixed organic liquid of xylene:methanol=3:1 for 30 minutes at an oscillation frequency of 38 KHz using an ultrasonic cleaning machine (US-4 manufactured by IUCHI), and it was confirmed that uniform dispersion was attained. Thereafter, the dispersion was uniformly sprayed on 3 kg of the methacrylic resin pellets, followed by carrying out the same blending and extrusion as in the preparation of the raw material pellets A to obtain a methacrylic resin composition containing 100 ppm of aluminum trioxide. This was referred to as raw material pellets H.

EXAMPLE 1

The raw material pellets A and the methacrylic resin pellets were uniformly mixed at a weight ratio of 1:19 by a tumbler. The resulting mixed pellets were extruded at a temperature of 250° C. using an extrusion sheet molding machine comprising a 50 mmφ single-screw extruder having a T-die for sheet, a temperature-controlled polishing roll and a take-off device to obtain an extruded plate of 300 mm in width and 6 mm in thickness containing 1 ppm of aluminum trioxide. Then, from the resulting extruded plate, a plate of 241 mm in width and 319 mm in length was cut out using a circular saw. The cut surface of this plate was subjected to abrasion by a precision abrading machine (PLA-BEAUTY manufactured by Megaro Technica Co., Ltd.) and further subjected to buffing to perform mirror finishing, thereby obtaining a light guiding plate containing 1 ppm of aluminum trioxide.

COMPARATIVE EXAMPLE 1

A light guiding plate was produced in the same manner as in Example 1, except that only the methacrylic resin pellets were used and the raw material pellets A were not used.

EXAMPLE 2

A light guiding plate containing 7 ppm of aluminum trioxide was produced in the same manner as in Example 1, except that the mixing weight ratio of the raw material pellets A and the methacrylic resin pellets was changed to 7:13.

EXAMPLE 3

A light guiding plate containing 20 ppm of aluminum trioxide was produced in the same manner as in Example 1, except that only the raw material pellets A were used without carrying out the dilution with the methacrylic resin pellets.

EXAMPLES 4 and 5

A light guiding plate containing 50 ppm or 100 ppm of aluminum trioxide was produced in the same manner as in Example 1, except that the raw material pellets B were used and the mixing weight ratio of the raw material pellets B and the methacrylic resin pellets was 1:3 or 1:1.

EXAMPLE 6

A light guiding plate containing 200 ppm of aluminum trioxide was produced in the same manner as in Example 1, except that only the raw material pellets B were used without carrying out the dilution with the methacrylic resin pellets.

EXAMPLE 7

The raw material pellets A and the methacrylic resin pellets were uniformly mixed at a weight ratio of 7:13 by a tumbler to obtain a raw material for injection molding. The resulting mixed pellets were molded at a temperature of 260° C. using an injection molding machine (IS550 manufactured by Toshiba Machine Co., Ltd.) having a mold and a mold temperature controlling device to obtain a light guiding plate of 241 mm in width, 319 mm in length and 6 mm in thickness which contained 7 ppm of aluminum trioxide.

EXAMPLE 8

0.014 g of aluminum trioxide (average particle diameter: 0.45 μm, refractive index: 1.76; manufactured by Nippon Light Metal Co., Ltd.) was added to 100 g of methyl methacrylate, and a dispersion was prepared by dispersing the particles using an ultrasonic cleaning machine (US-4 manufactured by IUCHI) for 30 minutes at an oscillation frequency of 38 KHz. A methacrylic resin syrup was prepared by dissolving 400 g of polymethyl methacrylate having an average molecular weight of 100,000 in 1500 g of methyl methacrylate. To the syrup were added the above dispersion, 0.8 g of 2,2-azobis(4-methoxy-2,4-dimethylvaleronitrile) and 0.3 g of 2-(5-methyl-2-hydroxyphenyl)benzotriazole as an ultraviolet absorber, followed by mixing uniformly while carrying out vacuum deaeration. The resulting mixture was poured into a cell comprising two glass plates of 9 mm in thickness and a gasket in accordance with conventional cell casting method, the cell was sealed, then polymerization was carried out for 12 hours in a water bath controlled to 40° C. in temperature, and thereafter post-polymerization was carried out at 110° C. for 3 hours to obtain a cast plate of 6 mm in thickness which contained 7 ppm of aluminum trioxide and 150 ppm of 2-(5-methyl-2-hydroxyphenyl)benzotriazole. Then, from the resulting cast plate, a plate of 241 mm in width and 319 mm in length was cut out using a circular saw. The cut surface of this plate was subjected to abrasion by a precision abrading machine (PLA-BEAUTY manufactured by Megaro Technica Co., Ltd.) and further subjected to buffing to perform mirror finishing, thereby obtaining a light guiding plate containing 7 ppm of aluminum trioxide.

EXAMPLE 9

A light guiding plate containing 7 ppm of aluminum trioxide was produced in the same manner as in Example 1, except that the raw material pellets E were used and the mixing weight ratio of the raw material pellets E and the methacrylic resin pellets was 7:43.

COMPARATIVE EXAMPLE 2

A light guiding plate containing 0.5 ppm of aluminum trioxide was produced in the same manner as in Example 1, except that the raw material pellets A were used and the mixing weight ratio of the raw material pellets A and the methacrylic resin pellets was changed to 1:39.

COMPARATIVE EXAMPLE 3

0.75 g of aluminum trioxide (average particle diameter: 0.05 μm, refractive index: 1.76; manufactured by Nippon Light Metal Co., Ltd.) was dispersed in 20 g of a mixed organic liquid of xylene:methanol=3:1 for 30 minutes at an oscillation frequency of 38 KHz using an ultrasonic cleaning machine (US-4 manufactured by IUCHI), and it was confirmed that uniform dispersion was attained. Thereafter, the dispersion was uniformly sprayed on 3 kg of the methacrylic resin pellets, followed by carrying out blending and extrusion in the same manner as in the preparation of the raw material pellets A to obtain a methacrylic resin composition containing 250 ppm of aluminum trioxide. A light guiding plate containing 250 ppm of aluminum trioxide was produced in the same manner as in Example 1, except that only the resulting composition pellets were used without carrying out the dilution with the methacrylic resin pellets.

COMPARATIVE EXAMPLE 4

A light guiding plate containing 7 ppm of aluminum trioxide was produced in the same manner as in Example 1, except that only the raw material pellets C were used without carrying out the dilution with the methacrylic resin pellets.

COMPARATIVE EXAMPLE 5

A light guiding plate containing 50 ppm of calcium carbonate was produced in the same manner as in Example 1, except that only the raw material pellets F were used without carrying out the dilution with the methacrylic resin pellets.

COMPARATIVE EXAMPLE 6

A light guiding plate containing 50 ppm of barium sulfate was produced in the same manner as in Example 1, except that only the raw material pellets G were used without carrying out the dilution with the methacrylic resin pellets.

EXAMPLE 10

0.15 g of aluminum trioxide (average particle diameter: 0.05 μm, refractive index: 1.76; manufactured by Nippon Light Metal Co., Ltd.) was dispersed in 20 g of a mixed organic liquid of xylene:methanol=3:1 for 30 minutes at an oscillation frequency of 38 KHz using an ultrasonic cleaning machine (US-4 manufactured by IUCHI), and it was confirmed that uniform dispersion was attained. Thereafter, the dispersion was uniformly sprayed on 3 kg of polycarbonate resin pellets (PANLITE/L-1250Y manufactured by Teijin Chemicals Ltd.), followed by blending the pellets as they were by a Henschel mixer (manufactured by Mitsui Miike Kogyo Co., Ltd.) at 1400 revolutions for 1 minute. This operation was repeated until the amount of the mixed pellets reached the necessary amount. The resulting mixed pellets were extruded by a 30 mmϕ twin-screw extruder (manufactured by Nakatani Co., Ltd.) at 260° C. while carrying out devolatilization at the vent part under reduced pressure of not higher than 100 Torr to obtain a polycarbonate resin composition containing 50 ppm of aluminum trioxide.

The resulting polycarbonate resin composition, the polycarbonate resin pellets and 2-(5-methyl-2-hydroxyphenyl) benzotriazole as an ultraviolet absorber were uniformly mixed at a weight ratio of 1:6.14:0.0011 by a tumbler. The resulting mixed pellets were extruded at a temperature of 260° C. using an extrusion sheet molding machine comprising a 50 mmϕ single-screw extruder having a T-die for sheet, a temperature-controlled polishing roll and a take-off device to obtain an extruded plate of 300 mm in width and 6 mm in thickness which contained 7 ppm of aluminum trioxide and 150 ppm of 2-(5-methyl-2-hydroxyphenyl) benzotriazole. Then, a light guiding plate containing 7 ppm of aluminum trioxide was obtained in the same manner as in Example 1.

EXAMPLE 11

0.15 g of aluminum trioxide (average particle diameter: 0.05 μm, refractive index: 1.76; manufactured by Nippon Light Metal Co., Ltd.) was dispersed in 20 g of a mixed organic liquid of xylene:methanol=3:1 for 30 minutes at an oscillation frequency of 38 KHz using an ultrasonic cleaning machine (US-4 manufactured by IUCHI), and it was confirmed that uniform dispersion was attained. Thereafter, the dispersion was uniformly sprayed on 3 kg of a cyclic olefin resin pellets (ZEONOR 1060R manufactured by Nippon Zeon Co., Ltd.), followed by blending the pellets as they were by a Henschel mixer (manufactured by Mitsui Miike Kogyo Co., Ltd.) at 1400 revolutions for 1 minute. This operation was repeated until the amount of the mixed pellets reached the necessary amount. The resulting mixed pellets were extruded by a 30 mmϕ twin-screw extruder (manufactured by Nakatani Co., Ltd.) at 250° C. while carrying out purging the hopper with nitrogen and devolatilization at the vent part with reducing the pressure to not higher than 100 Torr to obtain a cyclic olefin resin composition containing 50 ppm of aluminum trioxide.

The resulting cyclic olefin resin composition, the cyclic olefin resin pellets and 2-(5-methyl-2-hydroxyphenyl) benzotriazole as an ultraviolet absorber were uniformly mixed at a weight ratio of 1:6.14:0.0011 by a tumbler. The resulting mixed pellets were extruded at a temperature of 250° C. using an extrusion sheet molding machine comprising a 50 mmϕ single-screw extruder having a T-die for sheet, a temperature-controlled polishing roll and a take-off device while purging the hopper part with nitrogen to obtain an extruded plate of 300 mm in width and 6 mm in thickness which contained 7 ppm of aluminum trioxide and 150 ppm of 2-(5-methyl-2-hydroxyphenyl)benzotriazole. Then, a light guiding plate containing 7 ppm of aluminum trioxide was obtained in the same manner as in Example 1.

EXAMPLES 12 and 13

A light guiding plate containing 7 ppm or 20 ppm of titanium dioxide was produced in the same manner as in Example 1, except that the raw material pellets D were used and the mixing weight ratio of the raw material pellets D and the methacrylic resin pellets was 7:43 or 2:3.

Luminance of the light guiding plates obtained in Examples 1–13 and Comparative Examples 1–6 was measured, and visual evaluation on unevenness of color tone and unevenness of outgoing light was conducted. The results are shown in Table 1.

The light guiding plates of Examples 1–13 had considerably higher face luminous performance as compared with the light guiding plates of Comparative Examples 1, 2, 4, 5 and 6. The light guiding plate of Comparative Example 3 was somewhat improved in average luminance, but was conspicuous in the phenomenon that the outgoing light in the vicinity of lamp was great while the outgoing light in the central portion was too small (uneven outgoing light) and, besides, conspicuous in the phenomenon that it was strong in blueness in the vicinity of lamp and strong in yellowness in the central portion (uneven color tone), and thus the light guiding plate was unsuitable as a light guiding plate for display devices such as liquid crystal monitors.

Furthermore, the light guiding plates of Examples 5, 6 and 13 showed some phenomena of uneven color tone and uneven outgoing light, but they were usable as light guiding plates for display devices such as liquid crystal monitors.

EXAMPLE 14

One surface of the light guiding plate obtained in Example 2 was subjected to screen printing using a printing screen of 15 inches in size having a dot gradation and using matte medium SR931 (manufactured by Mino Group Co., Ltd.) as an ink, and another surface was provided with a diffusion layer. Luminance was measured in the same manner as in Example 1. The light guiding plate had an average luminance of 3100 cd/m², and did not show uneven color tone and uneven outgoing light. Thus, it had excellent performances.

COMPARATIVE EXAMPLE 7

The light guiding plate obtained in Comparative Example 1 was subjected to printing in the same manner as in Example 14, and luminance was measured. The light guiding plate had an average luminance of 2700 cd/m², and did not show uneven color tone and uneven outgoing light, but was lower 400 cd/m² in average luminance than the light guiding plate of Example 14.

EXAMPLE 15

A test piece having a plate thickness of 6 mm, an optical path length of 220 mm and a height of 30 mm for measurement of light transmittance of long optical path and yellowness of long optical path was prepared by cutting out from the light guiding plate obtained in Example 2 using a circular saw and subjecting both cut surfaces through which light entered to abrasion by a precision abrading machine (PLA-BEAUTY manufactured by Megaro Technica Co., Ltd.) and then to buffing. Light transmittance of long optical path and yellowness of long optical path were measured.

EXAMPLES 16–22

Light guiding plates containing 12 ppm, 17 ppm, 22 ppm, 32 ppm, 42 ppm, 70 ppm, and 100 ppm of aluminum trioxide were produced in the same manner as in Example 1, except that the raw material pellets H were used and the mixing weight ratio of the raw material pellets H and the methacrylic resin pellets was 12:88, 17:83, 22:78, 32:68, 42:58, 70:30, and 100:0. From the resulting light guiding plates, test pieces for measurement of light transmittance of long optical path and yellowness of long optical path were prepared in the same manner as in Example 15, and light transmittance of long optical path and yellowness of long optical path were measured.

COMPARATIVE EXAMPLE 8

From the light guiding plate obtained in Comparative Example 1, a test piece for measurement of light transmittance of long optical path and yellowness of long optical path was prepared in the same manner as in Example 15, and light transmittance of long optical path and yellowness of long optical path were measured.

The results of measurement in Examples 15–22 and Comparative Example 8 are shown in Table 2.

The optical path length can be optionally set, but in Examples 15–22 and Comparative Example 8, it was set longer, namely, at 220 mm, so that difference in the measured values can readily result due to the difference in content of the fine particles. This optical path length of 220 mm is a distance which corresponds to the distance between the lamp disposed at longer side edge of the light guiding plate and the central portion of the light guiding plate in a liquid crystal monitor of, for example, about 29 inches in size (the size ratio is shorter side:longer side=3:4).

Referring to the results of measurement in Examples 15–22, the light transmittance of long optical path decreased with increase of the content of aluminum trioxide. This is because light scattering became strong due to the increase of content of fine particles, and the luminous flux entering from the lamp was scattered in and emerged from the test piece. If the light transmittance of long optical path is too low, this causes "uneven outgoing light", namely, the central portion of the light guiding plate is darker than the portion near the lamp. Moreover, with increase of the content of aluminum trioxide, the yellowness of the long optical path tends to increase. If the yellowness of the long optical path is too high, this causes "uneven color tone", namely, the central portion of the light guiding plate becomes yellowish.

Here, it is natural that with change of the size in inch of the liquid crystal monitor, the optical path length also changes. For example, when the light guiding plate of the present invention is used for a liquid crystal monitor of 15 inches in size, the optical path length to the central portion of the light guiding plate is about 114 mm, and when the light guiding plate of the present invention is used for a liquid crystal monitor of 10 inches in size, the optical path length to the central portion of the light guiding plate is about 76 mm. With change of the optical path length, the light transmittance and the yellowness naturally change, and there is a tendency that with decrease of the optical path length, the light transmittance increases and the yellowness decreases.

Therefore, even in the case of a light guiding plate having a light transmittance of long optical path of less than 5% and a yellowness of long optical path of higher than 60 when the optical path length was 220 mm as in Examples 20–22, increase of luminance which is an effect of the present invention can be attained in liquid crystal monitors of different size in inch. In other words, luminance of light guiding plate is increased by properly adjusting the amount of the fine particles having a specific refractive index and a specific average particle diameter in the range of the present invention depending on the size of display devices, etc. in which the light guiding plate is used.

Furthermore, from the comparison of Example 15 in which was used the light guiding plate obtained in Example 2 with Comparative Example 8 in which was used the light guiding plate obtained in Comparative Example 1 (where fine particles were not contained in the resin composition), it was recognized that the light transmittance of long optical path in Example 15 was lower than that in Comparative Example 8, and the yellowness of long optical path in Example 15 was higher than that in Comparative Example 8. It can be said that this shows the above-mentioned tendency that with increase of the content of aluminum trioxide, the light transmittance of long optical path decreases and the yellowness of long optical path increases. However, in fact, unevenness in color tone and unevenness in outgoing light were also not seen in the light guiding plate of Example 15. Moreover, as is clear from the above results, the light guiding plate of Example 14 obtained by using the light guiding plate of Example 2 as in Example 15 was superior 400 cd/m² in average luminance as compared with the light guiding plate of Comparative Example 7 obtained by using the light guiding plate of Comparative Example 1 (where fine particles were not contained in the resin composition). Thus, the light guiding plates of the present invention where a specific amount of fine particles are contained in the resin composition have very high face luminous performance irrespective of the size of display devices.

TABLE 1

| | Particles | | | | Method for producing face luminous body | Average luminance (cd/m²) | Visual evaluation on unevenness of color tone and outgoing light |
|---|---|---|---|---|---|---|---|
| | Kind | Particle diameter (μm) | Amount (ppm) | Thermoplastic resin | | | |
| Example 1 | Aluminum trioxide | 0.45 | 1 | Methacrylic resin | Extrusion method | 80 | No |
| Example 2 | Aluminum trioxide | 0.45 | 7 | Methacrylic resin | Extrusion method | 1090 | No |
| Example 3 | Aluminum trioxide | 0.45 | 20 | Methacrylic resin | Extrusion method | 1330 | No |
| Example 4 | Aluminum trioxide | 0.05 | 50 | Methacrylic resin | Extrusion method | 1350 | Slight |
| Example 5 | Aluminum trioxide | 0.05 | 100 | Methacrylic resin | Extrusion method | 1400 | Some |
| Example 6 | Aluminum trioxide | 0.05 | 200 | Methacrylic resin | Extrusion method | 1230 | Some |
| Example 7 | Aluminum trioxide | 0.45 | 7 | Methacrylic resin | Injection molding method | 1085 | No |
| Example 8 | Aluminum trioxide | 0.45 | 7 | Methacrylic resin | Casting | 1095 | No |
| Example 9 | Aluminum trioxide | 0.45 | 7 | Methacrylic resin | Extrusion method | 760 | No |
| Example 10 | Aluminum trioxide | 0.45 | 7 | Polycarbonate | Extrusion method | 995 | No |
| Example 11 | Aluminum trioxide | 0.45 | 7 | Cyclic olefin | Extrusion method | 1025 | No |
| Example 12 | Titanium dioxide | 0.04 | 7 | Methacrylic resin | Extrusion method | 1370 | Slight |
| Example 13 | Titanium dioxide | 0.04 | 20 | Methacrylic resin | Extrusion method | 1670 | Some |
| Comp. Example 1 | No addition | — | — | Methacrylic resin | Extrusion method | 70 | No |
| Comp. Example 2 | Aluminum trioxide | 0.45 | 0.5 | Methacrylic resin | Extrusion method | 75 | No |
| comp. Example 3 | Aluminum trioxide | 0.05 | 250 | Methacrylic resin | Extrusion method | 500 | Great |
| Comp. Example 4 | Aluminum trioxide | 2 | 7 | Methacrylic resin | Extrusion method | 170 | No |
| Comp. Example 5 | Calcium carbonate | 0.04 | 50 | Methacrylic resin | Extrusion method | 75 | No |
| Comp. Example 6 | Barium sulfate | 0.05 | 50 | Methacrylic resin | Extrusion method | 80 | No |

TABLE 2

| | Particles | | | | | Light transmittance | Yellowness |
|---|---|---|---|---|---|---|---|
| | Kind | Particle diameter (μm) | Amount (ppm) | Thermoplastic resin | Production method | of long optical path (220 mm length) | of long optical path (220 mm length) |
| Example 15 | Aluminum trioxide | 0.45 | 7 | Methacrylic resin | Extrusion method | 40% | 30 |
| Example 16 | Aluminum trioxide | 0.45 | 12 | Methacrylic resin | Extrusion method | 30% | 38 |
| Example 17 | Aluminum trioxide | 0.45 | 17 | Methacrylic resin | Extrusion method | 21% | 44 |
| Example 18 | Aluminum trioxide | 0.45 | 22 | Methacrylic resin | Extrusion method | 13% | 51 |
| Example 19 | Aluminum trioxide | 0.45 | 32 | Methacrylic resin | Extrusion method | 8% | 53 |
| Example 20 | Aluminum trioxide | 0.45 | 42 | Methacrylic resin | Extrusion method | 3% | 61 |
| Example 21 | Aluminum trioxide | 0.45 | 70 | Methacrylic resin | Extrusion method | 1% | 67 |
| Example 22 | Aluminum trioxide | 0.45 | 100 | Methacrylic resin | Extrusion method | 0.6% | 76 |
| Comp. Example 8 | No addition | — | — | Methacrylic resin | Extrusion method | 90% | 2 |

INDUSTRIAL APPLICABILITY

The light guiding plates of the present invention are improved at their maximum in face luminous efficiency of the plates per se, thereby attaining the enhancement of luminance, and, as a result, there are provided light guiding plates suitable for display devices used in office automation apparatuses such as personal computers, word processors, etc., and various monitors displaying image signals such as panel monitors, television monitors, etc., display devices used in illuminators for indoor or outdoor space, and signs.

What is claimed is:

1. A light guiding plate in sheet form which comprises a transparent thermoplastic resin composition containing a transparent thermoplastic resin and fine particles, the refractive index and the average particle diameter of the fine particles being 1.7–3.0 and 0.01–1.0 μm, respectively, the amount of the fine particles being 1–200 ppm based on the weight of the transparent thermoplastic resin, and wherein the fine particles comprise aluminum trioxide.

2. A light guiding plate according to claim 1, wherein the transparent thermoplastic resin is a resin selected from the group consisting of methacrylic resins, polycarbonate resins and cyclic olefin resins.

3. A light guiding plate according to claim 1 or 2, wherein the transparent thermoplastic resin composition additionally contains an ultraviolet absorber.

4. A method for producing a transparent thermoplastic resin composition for a light guiding plate which comprises uniformly dispersing fine particles in a transparent thermoplastic resin, wherein the fine particles are previously dispersed in an organic liquid, molding to a sheet by extrusion molding, press molding, injection molding or casting, and wherein the fine particles comprise aluminum trioxide.

5. A method for producing a transparent thermoplastic resin composition for a light guiding plate according to claim 4, wherein the fine particles are dispersed in the organic liquid using an ultrasonic wave generating apparatus.

* * * * *